United States Patent [19]

Morrison et al.

[11] 3,990,666

[45] Nov. 9, 1976

[54] WHEEL CLAMP

[75] Inventors: Leonard A. Morrison, Chicago; Robert S. Hampton, Jr., Skokie; John Murphy, Waukegan; Leo C. Bogaerts, Antioch, all of Ill.

[73] Assignee: Ammco Tools, Inc., North Chicago, Ill.

[22] Filed: Aug. 25, 1975

[21] Appl. No.: 607,548

[52] U.S. Cl. ............................. 248/205 R; 33/203.21
[51] Int. Cl.² .................... G01B 5/25; G01C 15/00; G01B 11/275
[58] Field of Search .......... 248/205 R, 226 B, 180; 24/263.3 A; 33/203.21, 203.18

[56] References Cited
UNITED STATES PATENTS

| | | |
|---|---|---|
| 294,014 | 2/1884 | Comstock ........................ 248/180 X |
| 786,093 | 3/1905 | Bostrom .......................... 248/180 X |
| 955,911 | 4/1910 | Saegmuller et al. ................ 248/180 |
| 2,475,502 | 7/1949 | Holmes ............................ 248/201 |
| 2,603,002 | 7/1952 | Rubin et al. ............. 24/263.3 A UX |
| 2,682,694 | 7/1954 | Kempkes .................... 24/263 A UX |
| 3,199,208 | 8/1965 | Hunter ....................... 33/203.21 X |

*Primary Examiner*—J. Franklin Foss
*Attorney, Agent, or Firm*—Edmond T. Patnaude

[57] ABSTRACT

A wheel clamp incorporates a pair of leg members each having a pair of spaced apart rim grippers, the leg members being simultaneously adjustable toward and away from a center mount assembly having a mounting surface supported for limited universal movement.

10 Claims, 4 Drawing Figures

WHEEL CLAMP

The present invention relates in general to wheel clamps, and it relates more particularly to a new and improved wheel clamp for use in mounting wheel alignment apparatus to a wheel of an automotive vehicle.

BACKGROUND OF THE INVENTION

In order to align the wheels of automotive vehicles it is common practice to mount wheel alignment apparatus to the spindle or axle of the wheel by means of an annular permanent magnet. This is not always possible, and therefore, auxiliary mounting devices called wheel clamps have been clamped to the wheels. Such wheel clamps have included an adjustable planar mounting surface adapted to receive the wheel alignment apparatus.

OBJECTS OF THE INVENTION

An object of the present invention is to provide a new and improved wheel clamp for use in mounting wheel alignment apparatus to a wheel.

Another object of the invention is to provide a wheel clamp which can be used with mag wheels without marring or damaging the wheels.

Still another object of the invention is to provide a wheel clamp incorporating means for facilely adjusting the angle of a mounting surface relative to the axis of rotation of a wheel to which the clamp is attached.

A further object of the invention is to provide a wheel clamp incorporating means for positively securing the clamp to the rim of a wheel.

SUMMARY OF THE INVENTION

Briefly, the above and further objects may be realized in accordance with the present invention by providing a wheel clamp having a plurality of leg members each having gripper means for gripping the outer edge of the rim of a wheel, a center mount assemby having a planar mounting surface provided with a center reference point for use in aligning said wheel alignment apparatus with the axis of rotation of said wheel, means connecting said center mount to said leg members, means for simultaneously adjusting the radial distance between said gripper means and said center mount to position said center reference point in coaxial relationship with said wheel to which said clamp is attached, and means for rotatably adjusting said planar mounting surface about a point on said axis of rotation of said wheel.

BRIEF DESCRIPTION OF THE DRAWING

Further objects and advantages and a better understanding of the present invention can be had by reference to the following detailed description, wherein.

DETAILED DESCRIPTION OF THE INVENTION

Figure 1:
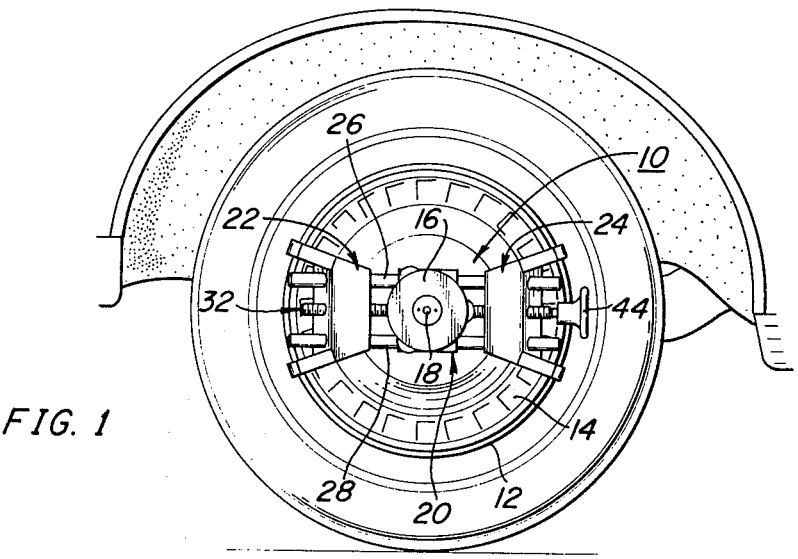
FIG. 1 is an elevational view of a wheel to which the wheel clamp of the present invention is mounted.

Referring to FIG. 1, a wheel clamp 10 embodying the present invention is mounted to a wheel 12 on an automotive vehicle. As may be seen from the drawing, the wheel clamp 10 is mounted over a wheel cover 14 which is in place on the wheel 12. The wheel clamp 10 includes a planar, annular mounting surface 16 which is manually adjustale so as to lie in a plane which is perpendicular to the axis of rotation of the wheel 12. Moreover, the wheel clamp 10 is provided with a central reference hole 18 which is coaxial with the axis of rotation of the wheel 12. In FIG. 1 the wheel clamp 10 is shown in use with a wheel of the stamped metal type but as this description proceeds it will be apparent that the wheel clamp 10 is also usable with mag wheels without marring or otherwise damaging the wheels.

Figure 2:
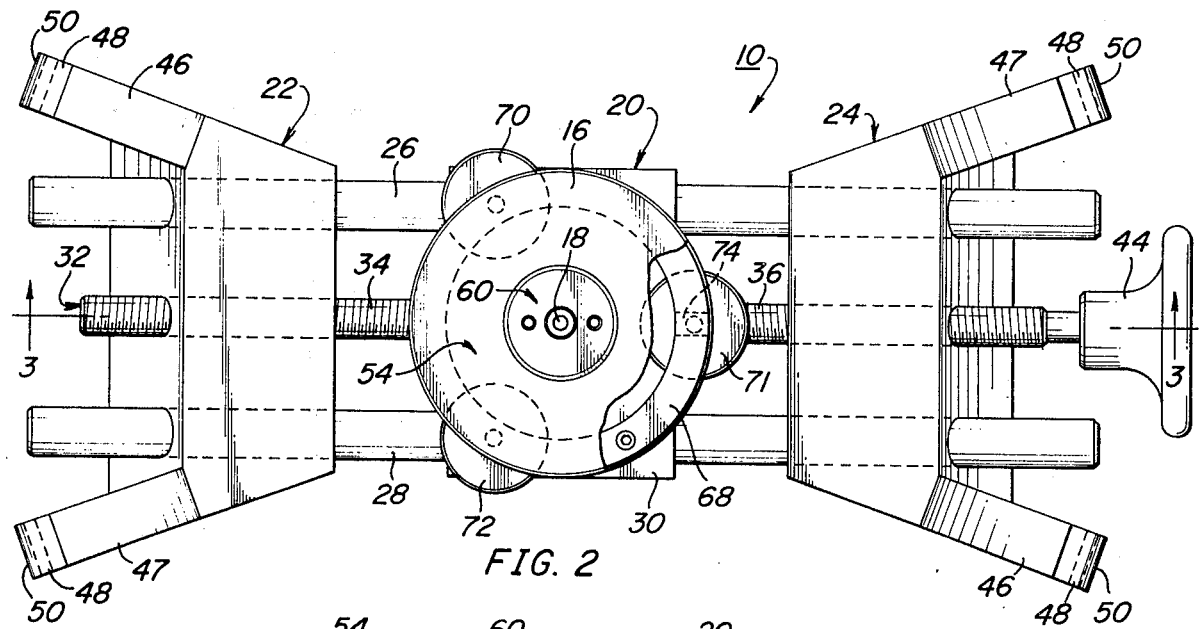
FIG. 2 is a enlarged, partly broken away view of a wheel clamp embodying the present invention.
Figure 3:
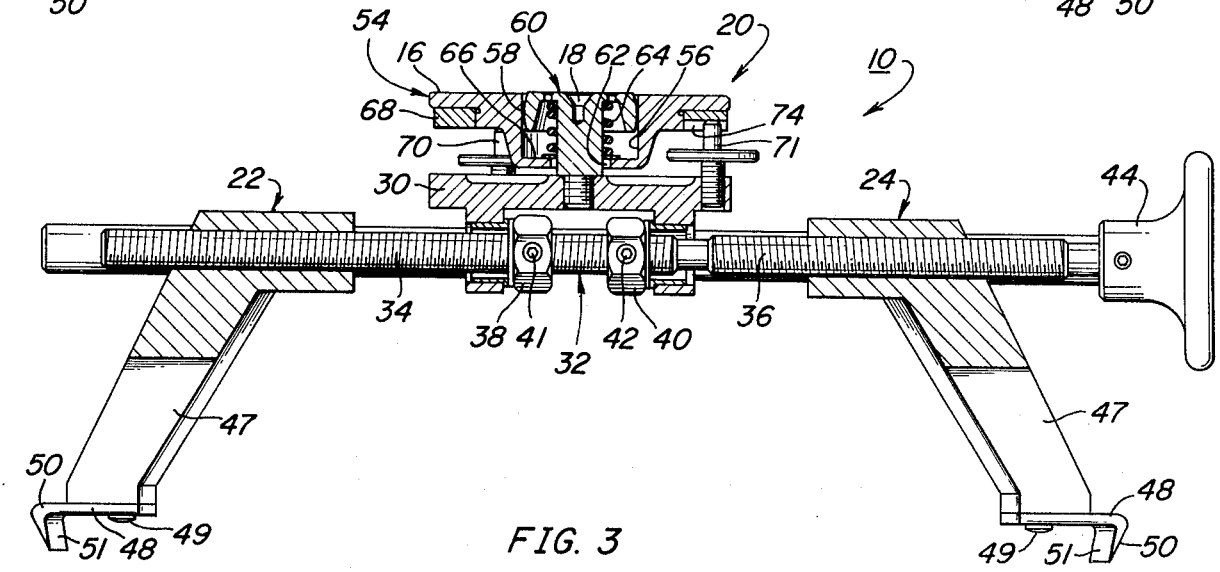
FIG. 3 is a sectional view taken along the line 3—3 of FIG. 2.

Referring more particularly to FIGS. 2 and 3, the wheel clamp 10 there shown comprises a center mount assembly 20 and a pair of leg members 22 and 24. The leg members 22 and 24 are slidably mounted on a pair of parallel guide rods 26 and 28 which are fixedly mounted in parallel relationship in the center mount assembly 20. More particularly, the mount assembly 20 includes a base member 30 having parallel bores through which the rods 26 and 28 extend and in which they are fixedly mounted.

In order to slidably and simultaneously move the leg members 22 and 24 along the guide rods 26 and 28, there is provided a drive screw 32 having a first threaded portion 34 threadedly received in the leg member 22 and a second threaded portion 36 threadedly received in the leg member 24. The threads 34 and 36 are lefthand and righthand threads, respectively. The drive screw is rotatable in the base member 30. A pair of nuts 38 and 40 are used to adjust the position of the base member 30 relative to the leg members 22 and 24 and the respective set screws 41 and 42 are provided for locking the adjustment nuts 38 and 40 in place. Thereafter, rotation of the drive screw 32 by means of a hand knob simultaneously moves the leg members 22 and 24 equal distances toward or away from the center mount assembly 20 thereby to maintain the reference hole 18 in the center of the leg members 22 and 24.

Figure 4:
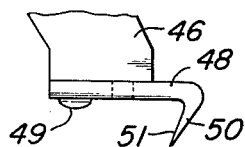
FIG. 4 is a detailed view of one of the rim gripper elements.

The leg members 22 and 24 each includes a pair of laterally extending legs 46 and 47 having gripper members 48 pivotally attached by a pivot screw 49 to the end portions thereof. The gripper members 48 have a hook-like end 50 having a surface 51 which is adapted to engage the peripheral surface of the rim of the wheel to which the clamp 10 is to be attached. As best seen in FIG. 4, the surface 51, while flat, lies at an angle which is inclined from the vertical so that when the clamp is in use the inner ends of the gripper members extend radially inward from the outer edge of the rim. In some cases the hook-like ends of the gripper members extend a short distance between the bead of the tire and the associated rim. Inasmuch as the grippers extend radially inward from the wheel rim when the clamp 10 is locked in place on the wheel, there is no way for the clamp to become dislodged from the wheel except by rotation of the drive screw 32. This is an important feature of the invention which prevents damage to the wheel alignment apparatus should a wheel clamp become spuriously dislodged from a wheel as is not uncommon with the prior art type wheel clamps which rely on a friction fit between the clamp and the wheel to hold the clamp in place.

In addition to the base member 30 the mounting assembly 20 includes a mounting member 54 formed of metal and on which the planar mounting surface 16 is provided. The mounting member 54 is provided with a centrally disposed cylindrical recess 56. The cylindrical wall of the recess 56 is engaged by a partially spherical surface 58 on a pivot post 60. The post 60 has a lower threaded end portion which extends through an opening 62 in the mounting member 54 and is threadedly secured to the center of the base member 30. A coil spring 64 is compressed between the pivot post 60 and an upwardly facing shoulder 66 at the bottom of the recess 56 to resiliently urge the mounting member 54 toward the base member 30. An annular bearing plate or ring 68 is mounted to the lower side of the mounting member 54 and engages the upper end of a plurality of manually adjustable screw members 70, 71 and 72. These adjusting members 70, 71 and 72 each have a threaded lower end threadedly received in threaded holes in the base member 30. The members 70, 71 and 72 are angularly spaced 120° apart. The bearing plate 68 is provided with a radial slot 74 into which the upper end of the adjustment screw 71 extends. The purpose of the slot 74 is to prevent the mounting member 54 from rotating relative to the wheel with which the clamp is being used. The ends of the other ajusting members 70 and 72 abut directly against the planar lower surface of the ring 68.

In order to permit alignment of the wheel aligning apparatus with the axis of rotation of the wheel, the reference point in the form of a recess 18 is provided at the center outer surface of the post 60. With the nuts 38 and 40 properly adjusted so that the reference hole 18 is equally spaced from each of the wheel rim engaging portions of the gripper members 48, rotation of the knob 44 to clamp the clamp 10 to a wheel automatically positions the center reference point, or axis of the recess 18, in coaxial relationship with the axis of rotation of the wheel. Adjustment of the screws 70, 71 and 72 to orient the planar surface 16 in perpendicular relationship with the axis of rotation of the wheel does not to any practical extent move the center of the surface 16 from the axis of rotation of the wheel or spindle on which it is mounted.

OPERATION

In use, the knob 44 of the wheel clamp 10 is rotated to move the gripper elements 48 apart a slightly greater distance than the diameter of the rim of the wheel to which the clamp is to be mounted. The clamp is then pressed against the outer surface of the wheel so that the hook-like ends 50 of the gripper elements extend over the rim surface of the wheel. The knob 44 is then rotated clockwise to move the leg members 22 and 24 toward the center mount assembly 20 until the gripper elements have firmly engaged the rim of the wheel. Because of the taper of the rim gripping surfaces 51 and the fact that the gripper elements 48 are pivotally attached to the leg members, the center mount assembly 20 is automatically centered relative to the wheel rim and the wheel clamp is positively locked in place. A spirit level may then be placed against the mounting surface 16 and the three adjustment screws 70, 71 and 72 adjusted to orient the surface 16 so that it lies in a plane perpendicular to the axis of rotation of the wheel 12. The wheel alignment apparatus may then be mounted to the surface 16 by means of the usual magnetic mount and centered relative to the axis of rotation of the wheel usng the reference point or recess 76.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:
1. A wheel clamp for use in mounting wheel alignment apparatus to a wheel comprising
   a center mount assembly having a planar mounting surface provided with a center reference point for use in aligning said apparatus with the axis of rotation of said wheel,
   a pair of leg members each having gripper means connected thereto for gripping the outer edge of the rim of said wheel,
   connecting means connecting said center mount to said leg members,
   said leg members being respectively slidable on said connecting means
   said gripper means being mounted for pivotal movement about respective axes lying perpendicular to the plane of said planar mounting surface,
   means for simultaneously moving said leg members relative to said center mount for adjusting the radial distances between said gripper means and said center mount to position and maintain said center reference point in coaxial relationship with said wheel to which said clamp is attached, and
   means for pivotally adjusting said planar mounting surface about a point on said axis of rotation of said wheel.
2. A wheel clamp according to claim 1 wherein said means for simultaneously adjusting comprises
   an adjusting screw having a first threaded portion engaging the first of said pair of legs and a second threaded portion engaging the second of said pair of legs,
   said first and second portions having respective lefthand and righthand threads.
3. A wheel clamp according to claim 1 wherein said mounting assembly comprises
   a base member to which said connecting means is connected,
   a mount member on which said mounting surface is provided,
   a pivot member fixed to said base member and having a partial spherical outer surface,
   said mount member having an internal annular surface engaging said partial spherical outer surface, and
   said means for adjusting said mounting surface includes a plurality of manually rotatable screws disposed between said base member and said mount member in angularly spaced relationshilp outwardly of said partial spherical surface,
   whereby adjustment of said screws pivot said mount member about the geometric center of said partial spherical surface.
4. A wheel clamp according to claim 3 wherein said rim engaging portions each comprises
   a generally L-shaped member pivotally attached to the respective leg and having an offset end portion for engaging the outer peripheral edge of said rim.
5. A wheel clamp according to claim 4 wherein
   said offset end portion has a substantially flat rim engaging surface which is inclined to extend behind said rim when said wheel clamp is clamped to said wheel.

6. A wheel clamp according to claim 3 further comprising
  a radial groove in the side of said mount member facing said base member, and
  one of said manually rotatable screws extending into said groove to prevent relative rotation between said mount member and said base member.

7. A wheel clamp according to claim 1 wherein said leg members each comprises
  a pair of laterally extending spaced apart legs respectively having said gripper means thereon.

8. A wheel clamp according to claim 7 wherein said means connecting said center mount to said leg members comprises
  a pair of parallel guide rods fixedly mounted to said center mount and extending from opposite sides thereon,
  said leg members being slidably mounted on said guide rods.

9. A wheel clamp according to claim 8 wherein said means for simultaneously adjusting comprises
  a drive screw extending through and rotatable in said center mount assembly,
  said drive screw having first and second threaded portions respectively engaging corresponding threads in said leg members, and
  said first and second threaded portios having lefthand and righthand threads respectively.

10. A wheel clamp according to claim 7 wherein
  said drive screw is parallel to said guide rods and is mounted therebetween.

* * * * *